(12) United States Patent
Faraj et al.

(10) Patent No.: US 10,390,351 B2
(45) Date of Patent: Aug. 20, 2019

(54) METHOD FOR ALLOCATING RADIO RESOURCES IN A COMMUNICATION SYSTEM USING NON-GSO SATELLITES WITH INTERFERENCE LEVEL CONSTRAINT TO A GEOSTATIONARY SYSTEM

(71) Applicant: THALES, Courbevoie (FR)

(72) Inventors: Zakariya Faraj, Blagnac (FR); Nicolas Chuberre, Pibrac (FR)

(73) Assignee: THALES, Courbevoie (FR)

( * ) Notice: Subject to any disclaimer, the term of this patent is extended or adjusted under 35 U.S.C. 154(b) by 155 days.

(21) Appl. No.: 15/377,872

(22) Filed: Dec. 13, 2016

(65) Prior Publication Data

US 2017/0181173 A1 Jun. 22, 2017

(30) Foreign Application Priority Data

Dec. 18, 2015 (FR) ..................... 15 02640

(51) Int. Cl.
*H04W 72/04* (2009.01)
*H04W 72/08* (2009.01)
*H04B 7/185* (2006.01)
*H04W 52/24* (2009.01)
*H04B 7/19* (2006.01)
*H04B 7/195* (2006.01)
*H04W 84/06* (2009.01)

(52) U.S. Cl.
CPC ...... *H04W 72/082* (2013.01); *H04B 7/18513* (2013.01); *H04B 7/19* (2013.01); *H04B 7/195* (2013.01); *H04W 52/243* (2013.01); *H04W 84/06* (2013.01)

(58) Field of Classification Search
CPC .................................................. H04W 72/08
See application file for complete search history.

(56) References Cited

U.S. PATENT DOCUMENTS

| | | | | |
|---|---|---|---|---|
| 6,011,951 A | * | 1/2000 | King ...................... | H04B 7/195 455/13.2 |
| 6,236,834 B1 | * | 5/2001 | Poskett .............. | H04B 7/18513 455/13.1 |
| 6,320,536 B1 | * | 11/2001 | Sasaki ................... | G01S 19/235 342/357.62 |
| 6,725,013 B1 | | 4/2004 | Chang et al. | |

(Continued)

FOREIGN PATENT DOCUMENTS

WO 2009/051907 A1 4/2009

*Primary Examiner* — Brandon M Renner (74) *Attorney, Agent, or Firm* — Baker & Hostetler LLP (57) ABSTRACT

A method for allocating radio resources for setting up satellite communications in a first communication system comprising a constellation of non-GSO satellites and a first set of terminals, the method comprises the following steps, for each terminal of the first set: determining a distinct separation angle threshold to be observed with respect to a constellation of geostationary satellites, a separation angle being defined as the smallest topocentric angle by which a given non-GSO satellite and any geostationary satellite of the geostationary arc are seen from a given terminal of the first set, authorizing the terminal to set up a communication link with a non-GSO satellite if the separation angle associated with the link is greater than or equal to the separation angle threshold.

19 Claims, 5 Drawing Sheets

(56) References Cited

U.S. PATENT DOCUMENTS

2003/0073404 A1    4/2003    Sauvageot et al.
2004/0110467 A1    6/2004    Wang
2016/0278063 A1*  9/2016    Zhang ................ H04W 72/046
2016/0278064 A1*  9/2016    Marsh ................ H04W 72/046

\* cited by examiner

METHOD FOR ALLOCATING RADIO RESOURCES IN A COMMUNICATION SYSTEM USING NON-GSO SATELLITES WITH INTERFERENCE LEVEL CONSTRAINT TO A GEOSTATIONARY SYSTEM

CROSS-REFERENCE TO RELATED APPLICATIONS

This application claims priority to foreign French patent application No. FR 1502640, filed on Dec. 18, 2015, the disclosure of which is incorporated by reference in its entirety.

FIELD OF THE INVENTION

The invention relates to the field of satellite communication systems and in particular the systems that use non-GSO satellites, for example satellites in low earth orbit.

The invention relates to a method for allocating radio resources in a communication system using non-GSO satellites operating in frequency bands reserved for geostationary systems. The invention concerns the taking into account, in the method for allocating radio resources, of the interference level generated by the system with non-GSO satellites to any communication system, using geostationary satellites.

BACKGROUND

The regulations concerning satellite radio communications make it possible to deploy non-geostationary systems in frequency bands previously reserved for the systems based on geostationary satellites.

However, the coexistence of two satellite communication systems using, totally or partially, the same frequency bands, poses a problem of management of the interference generated by one system to another. In this case, the geostationary system is likely to be disturbed, even interfered with, by the transmissions between satellites and ground stations belonging to the non-geostationary system.

To guarantee a given quality of service for a geostationary communication system, the International Telecommunications Union (ITU) has set a maximum authorised interference level for the geostationary telecommunication systems as a whole and originating from systems coexisting on the same frequency bands and using non-geostationary satellites.

To ensure that a non-geostationary system does not generate an interference level above an authorised threshold, one solution consists in setting, for the set of links between the ground terminals and the non-geostationary satellites, a separation angle threshold to be observed with respect to the geostationary arc. The geostationary arc designates the view of the geostationary orbit from the earth.

A terminal of the non-geostationary system is authorised to set up a communication link (uplink, down link or two-way) with a non-geostationary satellite if, and only if, its separation angle is greater than or equal to the separation angle threshold set and independently of the other links set up by the other terminals. Thus, each terminal sees the number of non-geostationary satellites with which it can potentially communicate being reduced. In particular, the non-geostationary systems can use spectral resources in band Ka and the terminals of these systems can operate with very low elevation angles. Such conditions bring about the requirement to use very high transmission powers. Such power levels then necessitate the use of a separation angle of high value so as not to interfere with the geostationary systems co-existing on the same band Ka. Typically, a separation angle threshold value of the order of 7 degrees is used to satisfy all these constraints. Unfortunately, the use of a separation angle with a value that is fixed to a constant and high value causes the geographic coverage provided by the non-geostationary system to be reduced.

A simple solution making it possible to ensure a level of service and a geographic coverage that are sufficient for the non-geostationary system while observing the recommended separation angle threshold consists in increasing the number of non-geostationary satellites in the constellation of the system. Thus, an average number of satellites available for each terminal is assured while the terminal-satellite links which are not compatible with the separation angle threshold are prohibited.

However, the increase in the number of non-geostationary satellites presents drawbacks of cost overheads for the design of the overall system and also of sub-optimality because the set of communication resources available is not fully used because of the impediment linked to the coexistence with the geostationary systems.

One static method described in the patent application US 2003/0073404 A1 proposes avoiding the alignments of the earth/space radio frequency links between a new non-geostationary system (system B) and other existing geostationary systems (systems A) sharing the same frequency band.

This method is based on taking into account predictive constraints such as the orbits of the satellites and the radio frequency characteristics of the stations and of the satellites of the systems A and B.

This static method is valid for systems operating in the low frequency bands such as band Ku. In effect, for this type of system, the geometrical aspect alone makes it possible to statically and deterministically schedule the earth/space radio frequency links to be used by the system B without causing interference on the other existing systems A and while ensuring the quality of service expected for the system B.

This strategy is justified when the atmospheric attenuations are negligible (which is the case with the systems using low frequency bands).

This static method is however no longer appropriate for a new system B operating in high frequency bands such as band Ka. In effect, the use of low elevations combined with high atmospheric attenuations, like those induced by rain, imposes an excessive over-dimensioning in terms of power required onboard and at the ground level of the infrastructure of the system B in order to ensure the expected quality of service.

A variant of the above method consists in forcing the earth/space radio frequency links of the new system B to be able to be implemented only when the satellites of the system B are seen by the stations of the system B with a high elevation angle. This makes it possible to reduce the dynamic range of the atmospheric attenuations even in high frequency bands like the band Ka.

Nevertheless, this strategy imposes an over-dimensioning in terms of the number of satellites to be deployed by the system B in order to ensure the rate of visibility required thereby. This over-dimensioning has a strong impact on the cost and the deployment of the ground and onboard infrastructures of the system B.

SUMMARY OF THE INVENTION

The present invention proposes remedying the abovementioned drawbacks by a method for allocating radio resources, in a communication system using non-GSO satellites, which defines, dynamically, a separation angle threshold to be observed for each terminal as a function of an overall interference level generated to the geostationary systems.

The invention makes it possible to maximize the geographic coverage by minimizing the number of satellites in the constellation of the non-geostationary system while ensuring that the interference level induced to the geostationary systems using totally or partially identical frequency bands does not exceed the regulatory threshold.

The subject of the invention is a method for allocating radio resources for setting up satellite communications in a first communication system comprising a constellation of non-GSO satellites and a first set of terminals, the method comprising the following steps, for each terminal of the first set:

determining a distinct separation angle threshold to be observed with respect to a constellation of geostationary satellites, a separation angle being defined as the smallest topocentric angle by which a given non-GSO satellite and any geostationary satellite of the geostationary arc are seen from a given terminal of the first set, authorising the terminal to set up a communication link with a non-GSO satellite if the separation angle associated with said link is greater than or equal to the separation angle threshold.

According to a particular aspect of the invention, the distinct separation angle threshold to be observed for each terminal of the first set is determined in such a way that the set of authorised communication links generates, on a geostationary satellite communication system, an interfering power level conforming to a regulatory limit.

According to a particular aspect of the invention, the determination of a separation angle threshold comprises:

the computation of at least one interfering power level generated by the set of communication links between the terminals of the first set and the non-GSO satellites to a geostationary satellite communication system, the iterative search, for each terminal of the first set, for the minimum separation angle threshold value making it possible to keep said at least one computed interfering power level in accordance with a regulatory limit.

According to a particular aspect of the invention, the determination of a separation angle threshold comprises an initialisation phase consisting in assigning an initial value to the separation angle threshold, for each terminal, and in declaring each terminal a candidate for the lowering of its separation angle threshold.

According to a particular aspect of the invention, said iterative search comprises, for each terminal and on each iteration, the association of said terminal with a non-GSO satellite observing the separation angle threshold determined on the current iteration and for which the separation angle is closest to said threshold, the iterations being continued as long as at least one terminal is a candidate for the lowering of its separation angle threshold.

According to a particular aspect of the invention, the communication links between the terminals of the first set and the non-GSO satellites are two-way or one-way uplinks and said iterative search comprises the computation of a first interfering power level generated by the set of communication uplinks to the geostationary arc for a set of assumed positions of geostationary satellites.

According to a particular aspect of the invention, the computation of said first interfering power level is determined by choosing, for each geostationary satellite, a pointing direction which makes it possible to maximize the value of said first interfering power level.

According to a particular aspect of the invention, said iterative search comprises the search for at least one geostationary satellite for which the first computed interfering power level is not in accordance with said regulatory limit.

According to a particular aspect of the invention, the communication links between the terminals of the first set and the non-GSO satellites are one-way down links and said iterative search comprises the computation of a second interfering power level generated by the set of communication down links to a set of assumed positions of terminals belonging to a geostationary satellite communication system.

According to a particular aspect of the invention, the communication links between the terminals of the first set and the non-GSO satellites are two-way and said iterative search comprises the computation of a second interfering power level generated by the set of communication down links to a set of assumed positions of terminals belonging to a geostationary satellite communication system.

According to a particular aspect of the invention, the computation of said second interfering power level is determined by choosing, for each terminal belonging to a geostationary satellite communication system, a pointing direction which makes it possible to maximize the value of said second interfering power level.

According to a particular aspect of the invention, said iterative search comprises the search for at least one terminal belonging to a geostationary satellite communication system for which the second computed interfering power level is not in accordance with said regulatory threshold.

According to a particular aspect of the invention, said iterative search comprises, for each first or second computed interfering power level not in accordance with said regulatory threshold, the search for at least one pair (terminal of the first set, non-GSO satellite) whose contribution, in the value of the first or the second interfering power level, is highest.

According to a particular aspect of the invention, said iterative search comprises, for each terminal of the pair (terminal of the first set, non-GSO satellite) retained, the re-establishment of the separation angle threshold determined on the preceding iteration and the removal of said terminal from the list of the candidates for the lowering of the separation angle threshold.

According to a particular aspect of the invention, said iterative search comprises, for at least one terminal of the pair (terminal of the first set, non-GSO satellite) retained, the adaptation of the RF characteristics of at least one link involving said terminal and a non-GSO satellite, so as to reduce the interfering power level of the set of authorised communication links on a geostationary satellite communication system.

According to a particular aspect of the invention, the iterative search comprises a verification of the conformity of the first interfering power level and/or of the second interfering power level and, if the conformity is borne out, the lowering of the separation angle threshold by a predetermined value, for each terminal that is a candidate for the lowering of its separation angle threshold.

According to a particular aspect of the invention, the iterative search is stopped when there is no longer any terminal that is a candidate for the lowering of its separation angle threshold.

Another subject of the invention is a device for allocating radio resources for setting up satellite communications comprising means, including at least one processor and one memory, configured to implement the method for allocating radio resources according to the invention.

Another subject of the invention is a computer programme comprising instructions for executing the method for allocating radio resources for setting up satellite communications according to the invention, when the programme is run by a processor.

Another subject of the invention is a processor-readable storage medium on which is stored a programme comprising instructions for executing the method for allocating radio resources for setting up satellite communications according to the invention, when the programme is run by a processor.

BRIEF DESCRIPTION OF THE DRAWINGS

Other features and advantages of the present invention will become more apparent on reading the following description in conjunction with the attached drawings which represent:

FIG. 1, a block diagram representing the context of application of the invention, FIG. 2, a flow diagram detailing the steps of a method for designing a non-geostationary satellite communication system according to the invention, FIG. 3, a flow diagram detailing the steps of a method for allocating radio resources according to the invention, FIG. 4, a flow diagram detailing the steps of a function for dynamically determining a separation angle threshold, according to a first embodiment of the invention, FIG. 5a, a diagram illustrating an exemplary computation of global interferences relating to the uplinks, FIG. 5b, a diagram illustrating an exemplary computation of global interferences relating to the down links, FIG. 6, a flow diagram detailing the steps of a function for dynamically determining a separation angle threshold, according to a second embodiment of the invention applied to the uplinks, FIG. 7, a flow diagram detailing the steps of a function for dynamically determining a separation angle threshold, according to a second embodiment of the invention applied to the down links.

DETAILED DESCRIPTION

Figure 1:
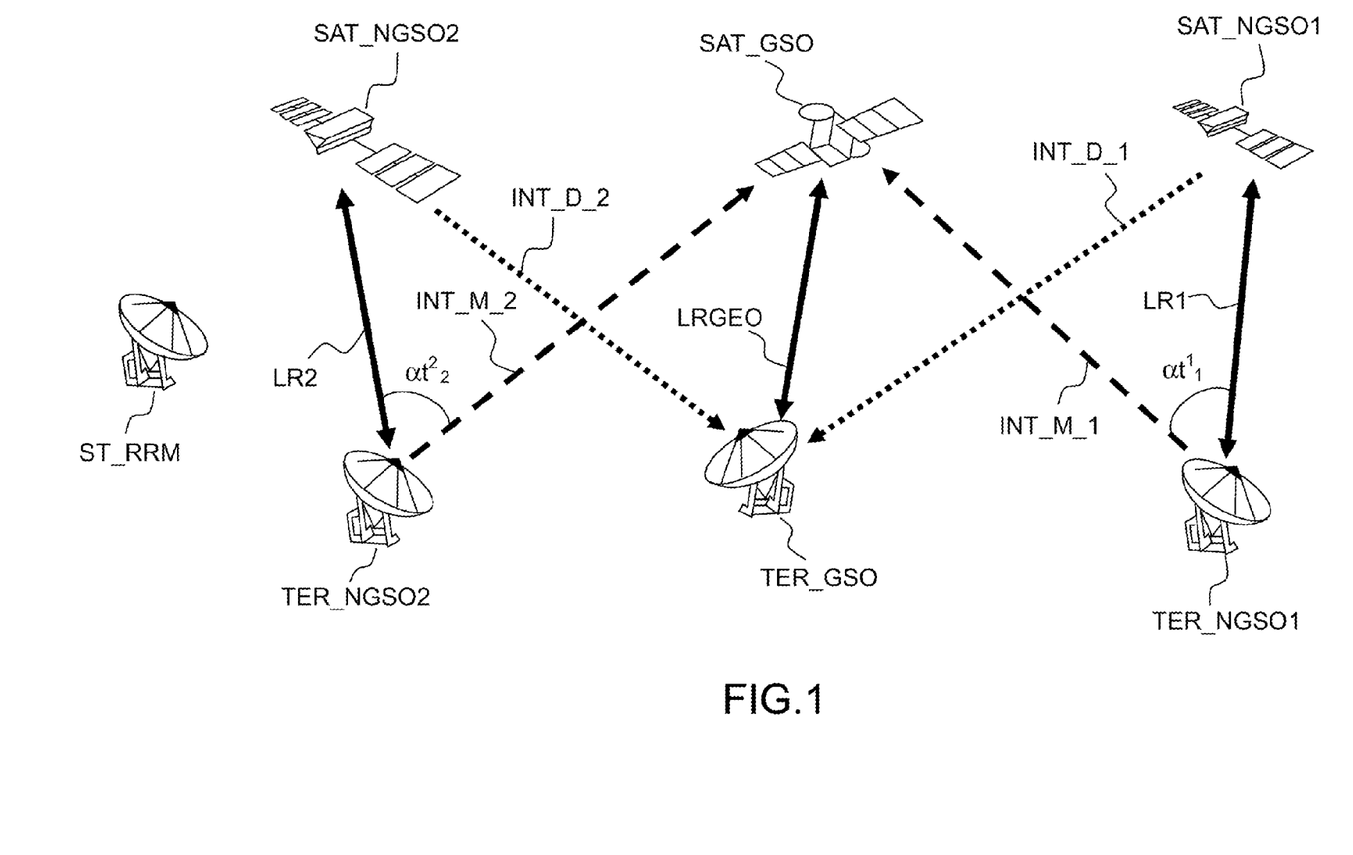

FIG. 1 schematically represents an exemplary scenario of application of the invention comprising a first communication system using non-GSO satellites and a second satellite communication system which is a geostationary system. The first communication system comprises a plurality of satellites SAT_NGSO1, SAT_NGSO2 and a set of terminals on the ground TER_NGSO1, TER_NGSO2. The terminals can be fixed or non-GSO and are capable of communicating with each satellite of the system by an uplink or a down link or a two-way link LR1, LR2. Similarly, the second geostationary communication system comprises a plurality of geostationary satellites and a set of terminals. To simplify, FIG. 1 shows only one satellite SAT_GSO and one terminal TER_GSO forming the second communication system and communicating with one another via a link by satellite LRGEO.

A terminal can be any network equipment capable of exchanging and communicating via a wireless link with a satellite. It can be in particular a fixed or portable computer, a fixed or portable telephone, a personal digital assistant, a server or even a modem for accessing the internet by satellite.

The first satellite communication system and the second satellite communication system are able to set up communications in totally or partially identical frequency bands. An example of frequency band used is the Ka band. Another example is the Ku band.

The first satellite communication system further comprises a satellite station ST_RRM comprising a control subsystem responsible for managing the allocation of communication resources within the system. The present invention can be implemented in the control subsystem.

The invention can be implemented on the basis of hardware and/or software elements. It can notably be implemented as a computer programme comprising instructions for the execution thereof. The computer programme can be stored on a processor-readable storage medium. The medium can be electronic, magnetic, optical or electromagnetic.

The invention can also be implemented by a device of the control subsystem type embedded in a satellite station, the device comprising a processor and a memory. The processor can be a generic processor, a specific processor, an application-specific integrated circuit (known by the acronym ASIC) or a field-programmable gate array (known by the acronym FPGA).

The device can use one or more dedicated electronic circuits or a general-purpose circuit. The technique of the invention can be implemented on a reprogrammable computation machine (a processor or a microcontroller for example) running a programme comprising a sequence of instructions, or on a dedicated computation machine (for example a set of logic gates like an FPGA or an ASIC, or any other hardware module).

As an example of hardware architecture suitable for implementing the invention, a device according to the invention can comprise a communication bus to which are linked a central processing unit (CPU) or microprocessor, a read only memory (ROM) being able to comprise the programmes necessary for the implementation of the invention; a random access memory (RAM) or cache memory comprising registers suitable for storing variables and parameters created and modified during the execution of the abovementioned programmes; and a communication or I/O (input/output) interface suitable for transmitting and receiving data.

A definition of an angle, identified in FIG. 1, is now introduced. This angle is used hereinbelow to explain the embodiments of the invention.

An angle at hereinafter designated topocentric angle is considered. As a reminder, a topocentric angle is an angle by which two given points are seen from a specific point on the earth. The particular topocentric angle at considered in the context of the invention is an angle formed by the direction between a terminal and a satellite of the first system and by the direction between this same terminal and a satellite of the geostationary system. FIG. 1 shows, by way of example, the topocentric angle $\alpha t_1^{\,1}$ associated with the terminal TER_NGSO1 and with the satellites SAT_NGSO1, SAT_GSO. Also represented is the topocentric angle $\alpha t_2^{\,2}$ associated with the terminal TER_NGSO2 and with the satellites SAT_NGSO2, SAT_GSO.

The concept of separation angle is also defined, for a link between a terminal of the first system TER_NGSO1, TER_NGSO2 and a non-GSO satellite of the first system SAT_NGSO1, SAT_NGSO2 as being the smallest topocentric angle obtained by varying the position of a geostationary satellite over the set of possible points of the geostationary arc.

In other words, the separation angle is defined as being the minimum angle by which a non-GSO satellite of the first constellation and any geostationary satellite are seen from a terminal of the first communication system.

The term separation angle is used because this angle defines the proximity between the link linking a terminal of the first system with a non-GSO satellite of the first constellation and the geostationary satellites. The lower this angle, the greater the likelihood of this link interfering on the geostationary satellites and also on the terminals on the ground of the geostationary systems. In particular, the interference generated on the geostationary satellites originates from the signal transmitted by a terminal of the first constellation to space, in other words over the Earth to space uplink. FIG. 1 schematically shows the interferences INT_M_1 generated by the terminal TER_NGSO1 on the geostationary satellite SAT_GSO and the interferences INT_M_2 generated by the terminal TER_NGSO2 on the geostationary satellite SAT_GSO.

Similarly, the interference generated on the ground terminals TER_GSO belonging to geostationary systems originates from the signal transmitted by a non-GSO satellite of the first communication system, in other words from the space to Earth down link. In FIG. 1, the interferences INT_D_1 generated by the satellite SAT_NGSO1 to the terminal TER_GSO of the geostationary system are also identified, as are the interferences INT_D_2 generated by the satellite SAT_NGSO2 to this same terminal TER_GSO.

As indicated in the preamble, a solution that makes it possible to observe a regulatory interference level consists in setting a threshold for this separation angle, for example a threshold equal to 7°, below which the link between a terminal and a satellite of the first system is prohibited, then making it necessary to select another satellite, to set up a link with the terminal, so as to observe a separation angle greater than the threshold set.

It should be noted that the term "separation angle" can also be replaced by "avoidance angle".

The invention proposes a method for dynamically configuring the thresholds applied to the separation angles to improve the allocation of communication resources available within the first communication system while guaranteeing observance of the regulatory interference level generated on the geostationary satellite communication systems.

Figure 2:
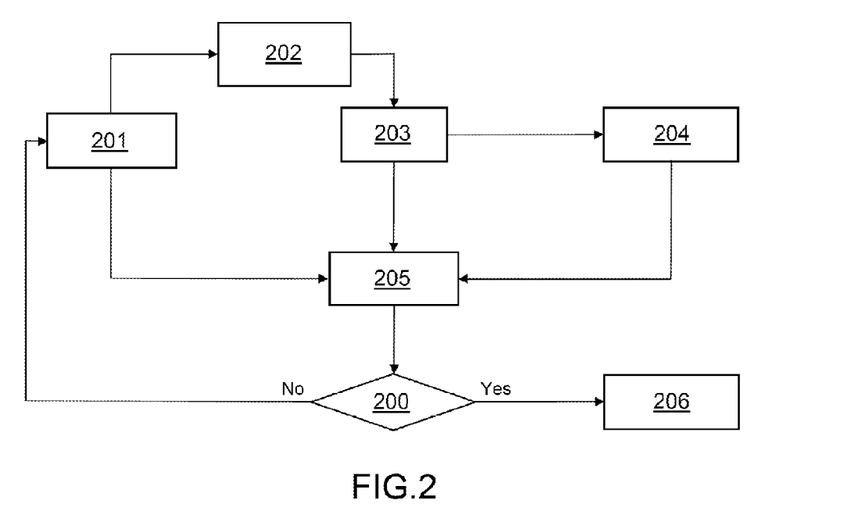

FIG. 2 schematically represents a flow diagram detailing the steps of a method for designing a satellite communication system according to the invention. The overall function of this method is the static management of radio resources of the system. Such a function is usually referred to by the expression "static radio resources management".

In a first step 201, a satellite operator provides a request for needs of a communication system which comprises needs in terms of quality of service, overall availability, overall bit rate, error rates or other general operating characteristics of such a system.

In a second step 202, the impact of the local atmospheric conditions on each terminal likely to be incorporated in the system is evaluated. This evaluation can be done by characterizing the level of attenuation of the signal received or transmitted by a terminal as a function of the elevation of the terminal.

In a third step 203, a link budget is computed both for the uplinks and the down links of the system. The computation of the link budget notably takes as input parameter the maximum attenuation level as a function of elevation for each terminal. For the uplink, the link budget can be evaluated by a computation of the equivalent isotropic radiated power (EIRP) required at the terminal. For the down link, the link budget can be evaluated by a computation of the G/T signal-to-noise ratio required at the terminal.

In a fourth step 204, the particular characteristics of the terminals to be deployed are evaluated to satisfy the link budget. Such characteristics can notably include the type of antenna or the type of amplifier embedded in the terminal. Furthermore, additional signal processing functionalities can be incorporated in the terminals of the system in order to combat the atmospheric attenuations of the signal.

In a fifth step 205, whether or not the needs of the operator can be satisfied is verified by taking into account the characteristics of the terminals selected at the end of the step 204 and by taking into account the attenuation bands of the signal as a function of the elevation bands of the different terminals.

If the needs of the connections 200 cannot be satisfied, a negotiation is set up with the operator to reduce the requirements in terms of quality of service or of bit rate.

If, however, the needs of the connections 200 are satisfied, then the needs for setting up communications between the terminals and the satellites are validated and there is a transition, via a step 206, to a radio resource allocation process. The step 206 consists in listing, for each terminal of the system, its radio frequency characteristics and the bit rate required.

Figure 3:
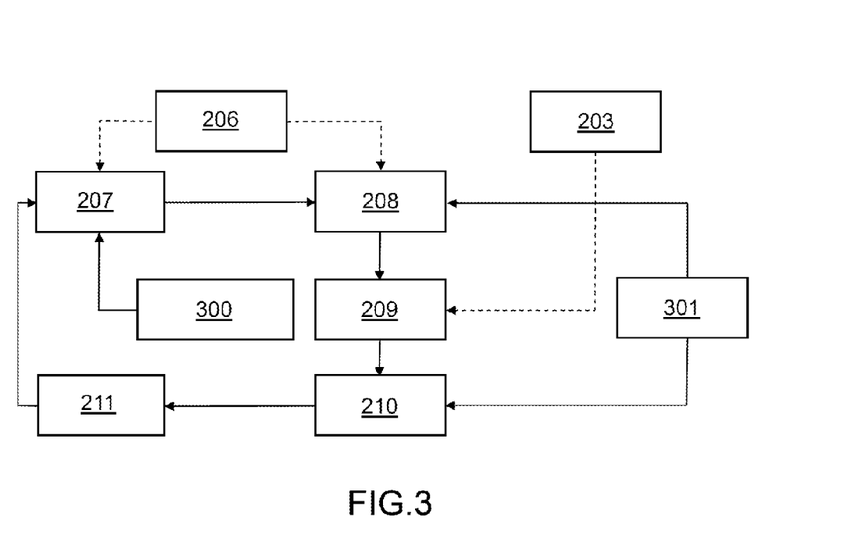

FIG. 3 details, in a flow diagram, the steps of the resource allocation method according to the invention.

The overall function of this method is dynamic management of radio resources of the system, or "dynamic radio resources management". In particular, the allocation of radio resources is performed over time by taking into account the dynamic trajectories of the non-geostationary satellites.

The method begins at the step 206 which analyses the number, the type, the location, the radio frequency characteristics and the bit rate required of each of the terminals of the system determined at the end of the design method described in FIG. 2.

In a step 208, the radio resources available for each terminal are identified. In other words, the satellites of the constellation of the system which are in line of sight from each terminal and which observe a determined separation angle threshold are identified, for each terminal, via the step 207 described in more detail hereinbelow. For each satellite, the identification of the radio resources can also comprise the identification of the frequency carriers which can be used to communicate and the number and the type of the antennas embedded onboard the satellite, in particular the polarization of the antennas.

At the end of the step 208, a list of satellites and of associated radio resources which can potentially be used by each terminal is obtained.

In a step 209, a sort is performed, for each terminal, in the list of the satellites obtained in order to establish an order of priority for the allocation of radio resources. The priorities are defined on the basis of a score assigned to each link, the score being determined notably as a function of a link budget computation which can be supplied by the step 203 of the design method described in FIG. 2.

In a step 210, an allocation of radio resources is then performed for each terminal as a function of the priority score assigned in the step 209.

The steps 208 and 210 are performed notably on the basis of the operational constraints of the system 301.

In a step 211, all the active radio links are aggregated on the basis of the results of the resource allocation step 210. In other words, all the uplinks and the down links between the terminals and satellites are identified in order to have an overview of the active radio links.

In a step 207, there is then dynamically determined, according to the invention, for each terminal, a separation angle threshold which makes it possible to observe the overall needs in terms of bit rates required while observing the interference level constraints on the geostationary satellite communication systems operating on the same frequency bands. This step 207 notably takes as input, the characteristics of the constellation of the satellites of the system, notably the positions of the non-GSO satellites, but also the regulatory interference level constraints and the characteristics of the geostationary systems that are to be preserved.

The determination of a separation angle threshold to be observed for each terminal notably takes into account a computation of overall interference level from the first system to the geostationary arc and to the ground stations.

The step 207 then provides, in the step 208, for the next iteration of the method, a separation angle threshold to be observed for each terminal to set up a link with a satellite, so as to observe the regulations imposed for the overall interference level.

The steps 208, 209, 210 are then iterated by eliminating, from the list of the satellites available for each terminal, those which do not make it possible to obtain a separation angle greater than or equal to the separation angle threshold.

The radio resource allocation step 210 can thus lead to the assignment to a terminal of satellites other than those chosen initially or on the preceding iteration.

According to a particular aspect of the invention, the links between terminals and satellites can be two-way or one-way. A terminal can be authorised to communicate with two different satellites over the uplink and over the down link or, on the contrary, the two links can be linked together in a single two-way link between a terminal and a satellite.

If the links between terminals and satellites are two-way, then the step 207 of the method according to the invention consists in determining a separation angle threshold associated with each terminal.

If, on the contrary, a terminal can communicate over an uplink with a satellite and over a down link with another satellite, then the step 207 of the method is duplicated to determine a first separation angle threshold applicable to each terminal for the uplinks and a second separation angle threshold applicable to each terminal for the down links.

The radio resource allocation method according to the invention described in FIG. 3 can be executed with a given rate or in response to an event in the life of the system, for example the entry or the exit of a terminal.

Figure 4:
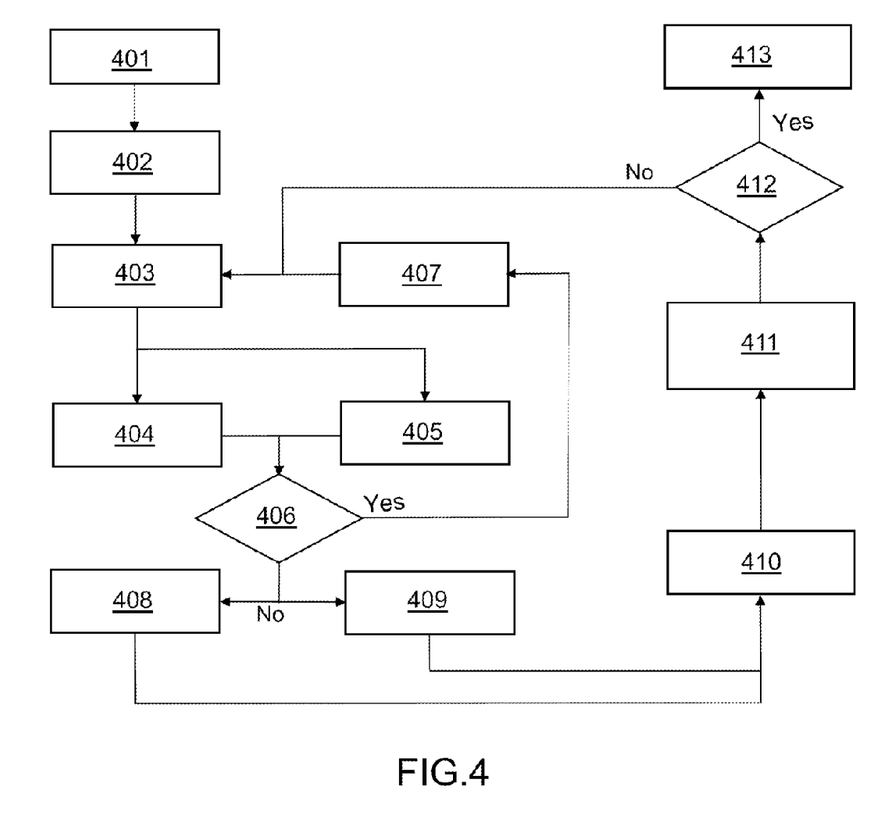

FIG. 4 illustrates a first exemplary embodiment, according to the invention, of the method for dynamically determining a separation angle threshold for each terminal, executed in the step 207. According to this first example, the links between terminals and satellites of the first communication system are considered two-way, that is to say that a terminal communicates with one and the same satellite over the uplink and over the down link. In a first step 401, the active terminals of the first communication system are identified as are the non-GSO satellites of the first constellation with which they can communicate according to the list established at the end of the step 208 of the radio resource allocation method described in FIG. 3.

For each active terminal, an initial predefined threshold value to be observed for the separation angle is set. This threshold can, for example, be set at a value of 7°. In a step 402, all the active terminals are then declared candidates for the potential lowering of their separation angle threshold. This declaration can be made, for example, through a vector or a table in which are listed the active terminals identified by a numeric identifier and a binary information item indicating whether or not the terminal is candidate for the potential lowering of its separation angle threshold.

In a step 403, there is associated, with each terminal of the first system, a satellite of the first constellation which observes the separation angle threshold set in the preceding step and which corresponds to the separation angle closest to the threshold. At the end of the step 403, there is therefore obtained, for each terminal, an associated satellite such that the link between this terminal and this satellite observes the separation angle threshold while minimizing the value of the separation angle. In some cases, no satellite can be retained because no satellite makes it possible to observe the initial separation angle threshold set. This scenario is dealt with in a variant embodiment of the invention described later.

The method then continues with the steps 404 and 405 in which a computation of worst case total interference level is performed. The concept of "worst case" computation consists in performing this computation for a minimum separation angle, identified in the preceding step 403, closest to the threshold considered for each terminal. According to the first exemplary embodiment of the method for determining a separation angle threshold described in FIG. 4, a first worst case total interference level computation for the uplinks between terminals and satellites of the first communication system is performed in the step 404 and a second worst case total interference level computation for the down links between satellites and terminals of the first communication system is performed in the step 405. The first and the second interference level computations are performed by aggregating the interference level contributions for each active terminal (for the uplink) or for each active satellite (for the down link).

The first interference level computation relates to the interferences generated by the transmissions from the active terminals to space on the satellites of the geostationary arc. These are interferences of those referenced INT_M_1, INT_M_2 in FIG. 1.

The second interference level computation relates to the interferences generated by the transmissions from the active satellites to Earth on the terminals belonging to the geostationary satellite communication systems. These are interferences of the type of those referenced INT_D_1, INT_D_2 in FIG. 1.

The total interference level generated can be computed through an equivalent power flux-density computation.

The equivalent power flux-density computation can, for example, be performed using the method described in ITU-R recommendation S.1325-3 from the International Telecommunications Union which is referenced here.

According to this recommendation, the equivalent power flux density epfd is defined as being the sum of the power flux densities produced on a reception station of a system with interference (situated on the surface of the Earth or in orbit, depending on the case) from all the transmission stations of an interfering system, given the off-axis discrimination of a reference reception antenna that is assumed to be pointed in its nominal direction.

In the present case, the interfering system is the first non-GSO satellite communication system and the system with interference is a geostationary satellite communication system.

Figure 5A:
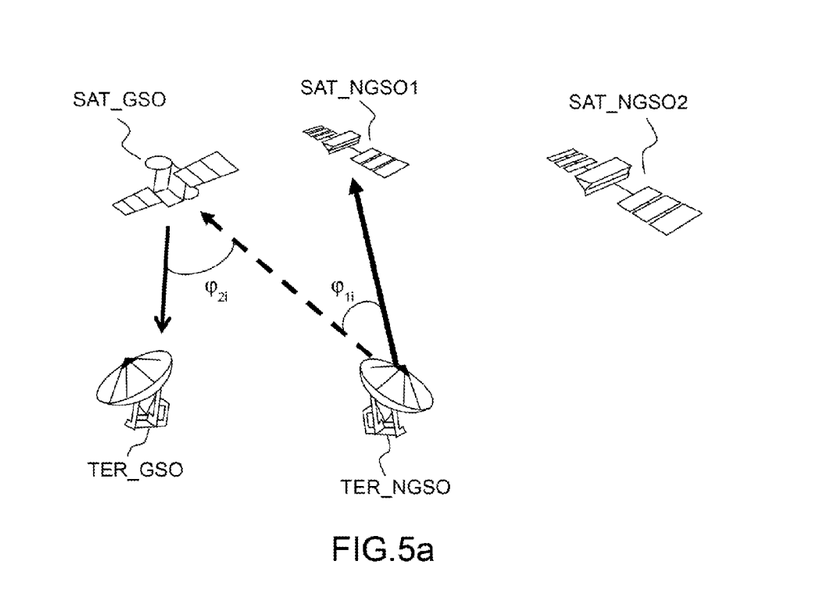

FIG. 5a represents, in a diagram, a terminal TER_NGSO and two satellites SAT_NGSO1, SAT_NGSO2 of the first communication system and a terminal TER_GSO and a satellite SAT_GSO of a geostationary system. The next paragraph explains an example of computation 404 of the equivalent power flux density epfd_up computed for the interferences produced by the transmissions from the terminal TER_NGSO to the satellite SAT_GSO of the geostationary system.

For each position of the geostationary arc, the equivalent power flux density epfd_up for the uplinks (first interference level computation 404) can be computed via the following relationship (1):

$$\text{epfd\_up} = 10\log_{10}\left(\sum_{i=1}^{i=N_a} 10^{P_i/10} \frac{G_t(\varphi_{1i})}{4\pi R_i^2} \frac{G_r(\varphi_{2i})}{G_{r_{max}}}\right) \quad (1)$$

in which:

$N_a$ is the number of terminals of the first communication system visible from a geostationary satellite (in FIG. 5a, just one terminal TER_NGSO is represented), i is the index of the terminal considered belonging to the first communication system, $P_i$ is the RF power at the input of the antenna of the terminal TER_NGSO considered belonging to the first communication system (dBW), $G_t(\varphi_{1i})$ is the gain of the transmission antenna of the terminal TER_NGSO considered belonging to the first communication system towards a geostationary satellite SAT_GSO, $G_r(\varphi_{2i})$ is the gain of the reception antenna of a geostationary satellite SAT_GSO towards the $1^{st}$ terminal considered of the first communication system TER_NGSO, $G_{r\,max}$ is the maximum gain of the antenna of a geostationary satellite SAT_GSO, $\varphi_{1i}$ is the angle between the line of sight of the terminal TER_NGSO considered (index i) belonging to the first communication system and the direction between the terminal TER_NGSO and a geostationary satellite SAT_GSO (angle represented in FIG. 5a), $\varphi_{2i}$ is the angle between the line of sight of a geostationary satellite SAT_GSO and the direction between this satellite SAT_GSO and the $1^{st}$ terminal TER_NGSO considered of the first communication system (angle represented in FIG. 5a), $R_i$ is the distance between the terminal TER_NGSO considered of the first communication system and the geostationary satellite SAT_GSO.

The computation of the equivalent power flux density epfd_up for the uplinks is performed for all the points of the geostationary arc with an appropriate sampling. The pointing direction of the geostationary satellite SAT_GSO, in other words the value of the angle $\varphi_{2i}$, is chosen so as to maximize the value of the interference level epfd_up. The pointing direction of the terminal of the first system TER_NGSO, in other words the value of the angle $\varphi_{1i}$, is given by the direction between this terminal TER_NGSO and the satellite SAT_NGSO selected in the step 403 (satellite which makes it possible to minimize the separation angle).

The value of the separation angle threshold has an influence both on the angle $\varphi_{1i}$ and on the angle $\varphi_{2i}$ since this value defines the relative separation of the non-GSO satellite SAT_NGSO relative to the geostationary satellite SAT_GSO. Consequently, the value of the separation angle threshold has an influence on the gain of the reception antenna of a geostationary satellite SAT_GSO in the line of sight of the terminal TER_NGSO of the first system and on the gain of the transmission antenna of the terminal TER_NGSO of the first system in the line of sight of the geostationary satellite SAT_GSO.

Figure 5B:
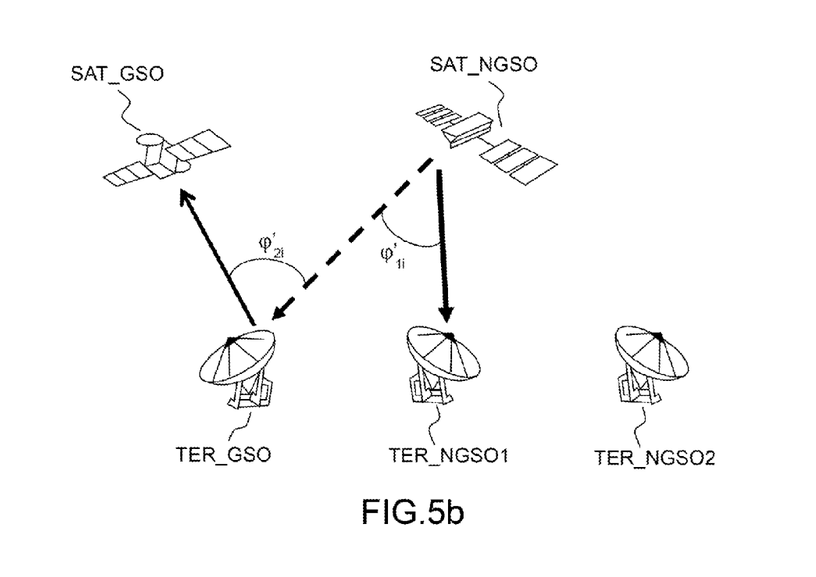

FIG. 5b represents, in a diagram, two terminals TER_NGSO1, TER_NGSO2 and a satellite SAT_NGSO of the first communication system and a terminal TER_GSO and a satellite SAT_GSO of a geostationary system. The next paragraph explains an example of computation 405 of the equivalent power flux density epfd_down computed for the interferences produced by the transmissions from the satellite SAT_NGSO to the terminal TER_GSO of the geostationary system.

Similarly, for each terminal TER_GSO placed on a point of the surface of the earth, the equivalent power flux density epfd_down for the down links (second interference level computation 405) can be computed via the relationship (2), identical to the relationship (1) but applied to the following variables:

$$\text{epfd\_down} = 10\log_{10}\left(\sum_{j=1}^{j=N_b} 10^{P'_j/10} \frac{G'_t(\varphi'_{1j})}{4\pi R'^2_j} \frac{G'_r(\varphi'_{2j})}{G'_{r_{max}}}\right) \quad (2)$$

$N_b$ is the number of satellites of the first constellation visible from a terminal belonging to the geostationary system (in FIG. 5b, a single satellite SAT_NGSO has been represented for purely illustrative purposes), $P'_i$ is the RF power at the input of the antenna of the satellite SAT_NGSO considered belonging to the first constellation (dBW), $G'_t(\varphi'_{1i})$ is the gain of the transmission antenna of the satellite SAT_NGSO considered belonging to the first constellation towards a terminal TER_GSO belonging to the geostationary system, $G'_r(\varphi'_{2i})$ is the gain of the reception antenna of a terminal TER_GSO belonging to the geostationary system towards the $1^{st}$ satellite SAT_NGSO considered of the first constellation, $G'_{r\,max}$ is the maximum gain of the antenna of a terminal TER_GSO of the geostationary system, $\varphi'_{1i}$ is the angle between the line of sight of the satellite SAT_NGSO considered (index i) belonging to the first constellation and the direction between this satellite SAT_NGSO and a terminal TER_GSO belonging to the geostationary system (angle represented in FIG. 5b), $\varphi'_{2i}$ is the angle between the line of sight of a terminal TER_GSO belonging to the geostationary system and the direction between this terminal TER_GSO and the $1^{st}$ satellite SAT_NGSO considered of the first constellation (angle represented in FIG. 5b), $R'_i$ is the distance between the satellite SAT_NGSO considered of the first constellation and the terminal TER_GSO of the geostationary system.

The relationship (2) is applied for a set of assumed positions of terminals of a geostationary system according to a predefined and appropriate meshing of the surface of the Earth. The pointing direction of the terminal TER_GSO belonging to the geostationary system, in other words the value of the angle $\varphi'_{2i}$, is chosen so as to maximize the value of the interference level epfd_down. The pointing direction of the satellite SAT_NGSO, in other words the value of the angle $\varphi'_{1i}$, is the pointing direction of the satellite SAT_NGSO selected in the step 403 (satellite which makes it possible to minimize the separation angle) to the terminal TER_NGSO considered.

The value of the separation angle threshold influences both the angle $\varphi'_{1i}$ and the angle $\varphi'_{2i}$ since this value defines the relative separation of the non-GSO satellite SAT_NGSO relative to the geostationary satellite SAT_GSO. Consequently, the value of the separation angle threshold has an influence on the gain of the reception antenna of a terminal TER_GSO belonging to the geostationary system in the line of sight of the satellite SAT_NGSO of the first system and on the gain of the transmission antenna of the satellite SAT_NGSO of the first system in the line of sight of the terminal TER_GSO.

The method continues with the application of a step 406 consisting in testing conformity of the interference levels computed in the steps 404 and 405 with limits specified by regulations, for example by the International Telecommunications Union.

In the step 406, a first conformity test is applied for the uplinks, consisting in comparing the first total interference level Epfd_up with a first regulatory limit. Similarly, a second conformity test is applied for the down links, consisting in comparing the second total interference level Epfd_down with a second regulatory limit.

The conformity tests of the step 406 can more generally consist in evaluating whether the first total interference level Epfd_up and the second total interference level Epfd_down are acceptable or not from the point of view of the operation of the geostationary systems.

If the two conformity tests performed in the step 406 conform, in other words if the two total interference levels are each below the regulatory limits over the entire geostationary arc and for all the assumed positions of terminals of a geostationary system, then the method continues with a step 407 which consists in reducing, by a predetermined value, the value of the separation angle threshold for each terminal that is a candidate for the lowering of its threshold.

Following the step 407, the method restarts at the step 403 for a new iteration.

The lowering of the separation angle threshold is possible here because the total interference level generated by setting the separation angle threshold at the initial value established in the first step 401 does not exceed the regulatory limits.

If, on the contrary, one of the two conformity tests performed in the step 406 does not conform, the method continues with the steps 408 and/or 409.

If the first conformity test, concerning the uplinks, does not conform, in other words if the first total interference level Epfd_up is above the first regulatory threshold for at least one point of the geostationary arc, the method continues with a step 408 which consists in identifying the geostationary satellites, in other words the points of the geostationary arc, which are subject to a non-conforming interference level.

If the second conformity test, concerning the down links, does not conform, in other words if the second total interference level Epfd_down is above the second regulatory threshold for at least one assumed position of a terminal of a geostationary system, the method continues with a step 409 which consists in identifying the terminals of the geostationary systems, in other words the points of the meshing of the Earth, which are subject to a non-conforming interference level.

The method continues with the step 410 in which, for each non-conformity recorded, the pairs (terminal, satellite) of the first system (as created at the end of the step 403) for which the contribution, in the total interference computation, is highest, are identified. This search is performed independently for the interference level computation associated with the uplinks epfd_up and for the interference level computation associated with the down links epfd_down. This search can be done by separately evaluating the terms of the sums involved in the relationships (1) and (2), in other words the interference levels computed for each of the $N_a$ terminals (for the uplinks) or each of the $N_b$ satellites (for the down links), and by searching for the pairs (terminal, satellite) which produce the highest interference level for each of the two conformity tests.

At the end of the step 410, there is therefore obtained a list of terminals of the first system which exhibit a separation angle threshold which generates a non-regulatory interference level on the geostationary systems.

In a step 411, for each terminal of the list identified in the step 410, the value of the separation angle threshold is restored to the value set on the preceding iteration then the terminal is removed from the list of the terminals that are candidates for the lowering of their separation angle threshold.

In a step 412, a check is carried out to see if the list of the terminals that are candidates for the lowering of their separation angle threshold is empty, and, if it is, the method goes on to step 413 which consists in updating, for each terminal, the value of the separation angle threshold to the last value set.

If this list 412 is not empty, then the method returns to the step 403 for a new iteration.

According to a variant of the first embodiment of the invention as described in FIG. 4, the step 411 is modified to take into account the cases where, when a separation angle threshold is restored to its value on the preceding iteration, a situation is obtained in which the terminal considered can no longer communicate with any satellite without infringing this threshold. In other words, no satellite is compatible with the separation angle threshold value for the terminal considered.

To take this possibility into account, the step 411 is modified as follows. For each terminal of the list identified in the step 410, the value of the separation angle threshold is restored to the value set on the preceding iteration if at least one satellite is accessible, for this terminal, with the old value.

Otherwise, the value of the separation angle threshold is maintained and the total interference level of the system is lowered by adapting the RF characteristics of the links involving the terminal and a satellite of the system. The adaptation can relate to the power density of the signal transmitted by the terminal (uplink) or of the signal transmitted by the satellite (down link). The adaptation can also relate to the type of antenna of the satellite and/or the frequency of the signals exchanged and/or the polarization of these signals.

The step 411 in all cases ends with the removal of the terminal from the list of the terminals that are candidates for the lowering of their separation angle threshold.

In a second embodiment, according to the invention, of the method for dynamically determining a separation angle threshold for each terminal, executed in the step 207, the uplinks and the down links are considered independent. In other words, one and the same terminal can communicate with a first satellite by an uplink and with a second satellite by a down link. In this second example, a first separation angle threshold for the uplinks and a second separation angle threshold for the down links are considered separately.

The method described in FIG. 4 is then applied independently for the uplinks and for the down links. The steps of the method have been represented according to the second embodiment applied to the uplinks in FIG. 6 and applied to the down links in FIG. 7.

Figure 6:
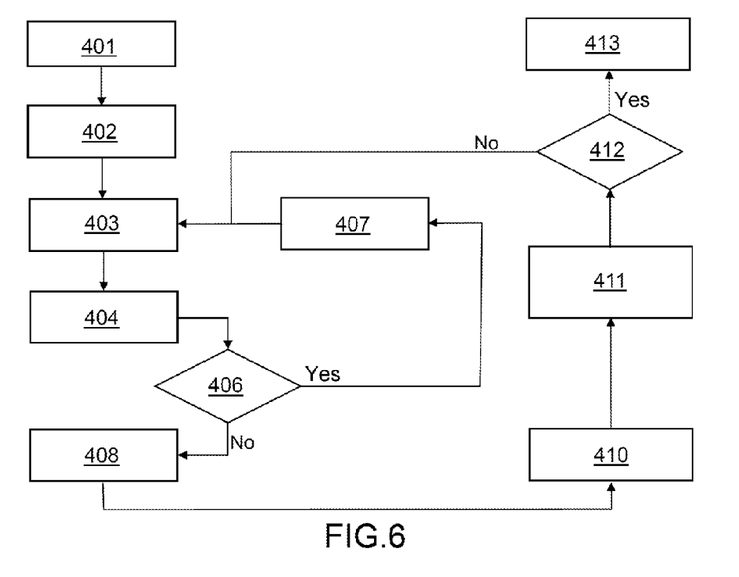

The method described in FIG. 6 for the one-way uplinks is identical to that described in FIG. 4 for the two-way links, except for the fact that the steps 405 and 409, which relate to the computation of interferences generated by the downlinks, are eliminated.

Figure 7:
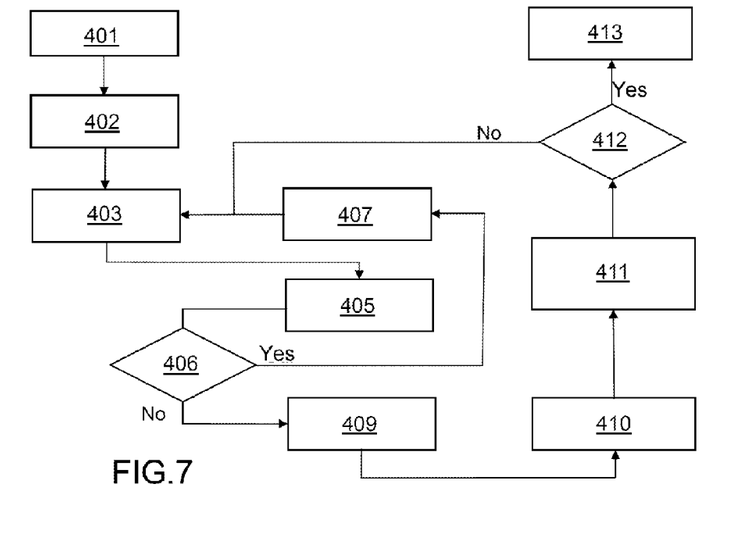

The method described in FIG. 7 for the one-way down links is identical to that described in FIG. 4 for the two-way links, except for the fact that the steps 404 and 408, which relate to the computation of interferences generated by the uplinks, are eliminated.

The two exemplary embodiments of the method, according to the invention, for dynamically determining a separation angle threshold as described with the support of the algorithm of FIG. 4 are given by way of illustration. Without departing from the scope of the invention, the method can be implemented through other implementations. In particular, the iterative processing described in FIG. 4 can be replaced by an algorithm consisting in computing the total interference levels Epfd_up, Epfd_down for several separation angle thresholds, taken from a variation range. For example, it is possible to compute the total interference levels for separation angle thresholds varying from 2° to 7° in 0.5° steps. All of the computation results are saved in memory then a parametric optimization is performed to determine, for each active terminal, the separation angle threshold which makes it possible to obtain the lowest total interference level or which makes it possible to obtain a total interference level that observes the regulatory threshold.

The invention claimed is:

1. A method for allocating radio resources for setting up satellite communications in a first communication system comprising a constellation of non-geostationary (non-GSO) satellites and a first set of terminals, the method comprising the following steps, for each terminal of the first set of terminals:
   determining a distinct separation angle threshold to be observed with respect to a constellation of geostationary satellites, a separation angle being defined as the smallest topocentric angle by which a given non-GSO satellite and any geostationary satellite of the geostationary arc are seen from a given terminal of the first set of terminals,
   authorising the terminal to set up a communication link with a non-GSO satellite if the separation angle associated with said link is greater than or equal to the separation angle threshold,
   wherein determining a distinct separation angle threshold for each terminal comprises:
      computing at least one interfering power level generated by the set of communication links between the terminals of the first set of terminals and the non-GSO satellites towards a geostationary satellite communication system, the interfering power level being a function of all distinct separation angle thresholds of all terminals of the first set, and
      iteratively selecting, independently for each terminal of the first set of terminals, a minimum value of the distinct separation angle threshold to be observed by the terminal such that said at least one computed interfering power level remains in accordance with a regulatory limit.

2. The method for allocating radio resources for setting up satellite communications of claim 1, wherein the distinct separation angle threshold to be observed for each terminal of the first set of terminals is determined in such a way that all authorised communication links generate together, on a geostationary satellite communication system, an interfering power level conforming to a regulatory limit.

3. The method for allocating radio resources for setting up satellite communications of claim 1, wherein the determination of a separation angle threshold comprises an initialisation phase comprising assigning an initial value to the separation angle threshold, for each terminal, and declaring each terminal a candidate for the lowering of its separation angle threshold.

4. The method for allocating radio resources for setting up satellite communications of claim 3, wherein said iterative search comprises, for each terminal and on each iteration, the association of said terminal with a non-GSO satellite observing the separation angle threshold determined on the current iteration and wherein the separation angle is closest to said threshold, the iterations being continued as long as at least one terminal is a candidate for the lowering of its separation angle threshold.

5. The method for allocating radio resources for setting up satellite communications of claim 4, wherein the communication links between the terminals of the first set of terminals and the non-GSO satellites are two-way or one-way uplinks and said iterative search comprises the computation of a first interfering power level generated by the set of communication uplinks to the geostationary arc for a set of assumed positions of geostationary satellites.

6. The method for allocating radio resources for setting up satellite communications of claim 5, wherein the computation of said first interfering power level is determined by choosing, for each geostationary satellite, a pointing direction which makes it possible to maximize the value of said first interfering power level.

7. The method for allocating radio resources for setting up satellite communications of claim 5, wherein said iterative search comprises the search for at least one geostationary satellite for which the first computed interfering power level is not in accordance with said regulatory limit.

8. The method for allocating radio resources for setting up satellite communications of claim 4, wherein the communication links between the terminals of the first set of terminals and the non-GSO satellites are one-way down links and said iterative search comprises the computation of a second interfering power level generated by the set of downlink communication to a set of assumed positions of terminals belonging to a geostationary satellite communication system.

9. The method for allocating radio resources for setting up satellite communications of claim 5, wherein the communication links between the terminals of the first set of terminals and the non-GSO satellites are two-way and said iterative search comprises the computation of a second interfering power level generated by the set of downlink communication to a set of assumed positions of terminals belonging to a geostationary satellite communication system.

10. The method for allocating radio resources for setting up satellite communications of claim 8, wherein the computation of said second interfering power level is determined by choosing, for each terminal belonging to a geostationary satellite communication system, a pointing direction which makes it possible to maximize the value of said second interfering power level.

11. The method for allocating radio resources for setting up satellite communications of claim 8, wherein said iterative search comprises the search for at least one terminal belonging to a geostationary satellite communication system for which the second computed interfering power level is not in accordance with said regulatory threshold.

12. The method for allocating radio resources for setting up satellite communications of claim 8, wherein said iterative search comprises, for each first or second computed interfering power level not in accordance with said regulatory threshold, the search for at least one pair (terminal of the first set of terminals, non-GSO satellite) whose contribution, in the value of the first or the second interfering power level, is highest.

13. The method for allocating radio resources for setting up satellite communications of claim 12, wherein said iterative search comprises, for each terminal of the pair (terminal of the first set of terminals, non-GSO satellite) retained, the re-establishment of the separation angle threshold determined on the preceding iteration and the removal of said terminal from the list of the candidates for the lowering of the separation angle threshold.

14. The method for allocating radio resources for setting up satellite communications of claim 12, wherein said iterative search comprises, for at least one terminal of the pair (terminal of the first set of terminals, non-GSO satellite) retained, the adaptation of the RF characteristics of at least one link involving said terminal and a non-GSO satellite, so as to reduce the interfering power level of the set of authorised communication links on a geostationary satellite communication system.

15. The method for allocating radio resources for setting up satellite communications of claim 5, wherein the iterative search comprises a check of the conformity of the first interfering power level and/or of the second interfering power level and, if the conformity is checked, the lowering of the separation angle threshold by a predetermined value, for each terminal that is a candidate for the lowering of its separation angle threshold.

16. The method for allocating radio resources for setting up satellite communications of claim 3, wherein the iterative search is stopped when there is no longer any terminal that is a candidate for the lowering of its separation angle threshold.

17. A device for allocating radio resources for setting up satellite communications comprising means, including at least one processor and one memory, configured to implement a method for allocating radio resources for setting up satellite communications in a first communication system comprising a constellation of non-geostationary (non-GSO) satellites and a first set of terminals, the method comprising the following steps, for each terminal of the first set of terminals:
    determining a distinct separation angle threshold to be observed with respect to a constellation of geostationary satellites, a separation angle being defined as the smallest topocentric angle by which a given non-GSO satellite and any geostationary satellite of the geostationary arc are seen from a given terminal of the first set of terminals,
    authorising the terminal to set up a communication link with a non-GSO satellite if the separation angle associated with said link is greater than or equal to the separation angle threshold,
    wherein determining the distinct separation angle threshold for each terminal comprises:
        computing at least one interfering power level generated by the set of communication links between the terminals of the first set of terminals and the non-GSO satellites towards a geostationary satellite communication system, the interfering power level being a function of all distinct separation angle thresholds of all terminals of the first set, and
        iteratively selecting, independently for each terminal of the first set of terminals, a minimum value of the distinct separation angle threshold to be observed by the terminal such that said at least one computed interfering power level remains in accordance with a regulatory limit.

18. A computer program comprising instructions stored on a tangible non-transitory storage medium for executing on a processor a method for allocating radio resources for setting up satellite communications in a first communication system comprising a constellation of non-geostationary (non-GSO) satellites and a first set of terminals, the method comprising the following steps, for each terminal of the first set of terminals:
    determining a distinct separation angle threshold to be observed with respect to a constellation of geostationary satellites, a separation angle being defined as the smallest topocentric angle by which a given non-GSO satellite and any geostationary satellite of the geostationary arc are seen from a given terminal of the first set of terminals,
    authorising the terminal to set up a communication link with a non-GSO satellite if the separation angle associated with said link is greater than or equal to the separation angle threshold,
    wherein determining the distinct separation angle threshold for each terminal comprises:
        computing at least one interfering power level generated by the set of communication links between the terminals of the first set of terminals and the non-GSO satellites towards a geostationary satellite communication system, the interfering power level being a function of all distinct separation angle thresholds of all terminals of the first set, and
        iteratively selecting, independently for each terminal of the first set of terminals, a minimum value of the distinct separation angle threshold to be observed by the terminal such that said at least one computed interfering power level remains in accordance with a regulatory limit.

19. A tangible non-transitory processor-readable recording medium on which is recorded a program comprising instructions for executing a method for allocating radio resources for setting up satellite communications in a first communication system comprising a constellation of non-GSO satellites and a first set of terminals, the method comprising the following steps, for each terminal of the first set of terminals:
    determining a distinct separation angle threshold to be observed with respect to a constellation of geostationary satellites, a separation angle being defined as the smallest topocentric angle by which a given non-geostationary (non-GSO) satellite and any geostationary satellite of the geostationary arc are seen from a given terminal of the first set of terminals,
    authorising the terminal to set up a communication link with a non-GSO satellite if the separation angle associated with said link is greater than or equal to the separation angle threshold, wherein determining the distinct separation angle threshold for each terminal comprises:
computing at least one interfering power level generated by the set of communication links between the terminals of the first set of terminals and the non-GSO satellites towards a geostationary satellite communication system, the interfering power level being a function of all distinct separation angle thresholds of all terminals of the first set, and
iteratively selecting, independently for each terminal of the first set of terminals, a minimum value of the distinct separation angle threshold to be observed by the terminal such that said at least one computed interfering power level remains in accordance with a regulatory limit.

* * * * *